(12) United States Patent
Uhrner et al.

(10) Patent No.: US 8,944,436 B2
(45) Date of Patent: Feb. 3, 2015

(54) RADIAL SHAFT SEAL

(75) Inventors: Klaus-Jürgen Uhrner, Leingarten (DE); Roland Bleier, Mühlheim (DE)

(73) Assignee: KACO GmbH + Co. KG, Heilbronn (DE)

( * ) Notice: Subject to any disclaimer, the term of this patent is extended or adjusted under 35 U.S.C. 154(b) by 0 days.

(21) Appl. No.: 13/097,091

(22) Filed: Apr. 29, 2011

(65) Prior Publication Data
US 2011/0204578 A1 Aug. 25, 2011

Related U.S. Application Data

(62) Division of application No. 11/952,451, filed on Dec. 7, 2007, now abandoned.

(30) Foreign Application Priority Data

Dec. 8, 2006 (DE) .......................... 10 2006 059 397

(51) Int. Cl.
*F16J 15/32* (2006.01)

(52) U.S. Cl.
CPC .......... *F16J 15/3276* (2013.01); *F16J 15/3228* (2013.01); *F16J 15/3252* (2013.01)
USPC ............................ 277/551; 277/573; 277/574

(58) Field of Classification Search
CPC ....... F16J 15/32; F16J 15/322; F16J 15/3248; F16J 15/3252

USPC ........................................... 277/551, 572–574
See application file for complete search history.

(56) References Cited

U.S. PATENT DOCUMENTS

| | | | | |
|---|---|---|---|---|
| 2,310,405 A | * | 2/1943 | Dodge | 277/553 |
| 2,819,106 A | * | 1/1958 | Vanderveer | 277/574 |
| 3,620,540 A | * | 11/1971 | Jagger et al. | 277/559 |
| 3,924,861 A | * | 12/1975 | Szepesvary | 277/551 |
| 4,623,153 A | * | 11/1986 | Nagasawa | 277/551 |
| 4,911,454 A | * | 3/1990 | Rapp et al. | 277/573 |
| 5,503,408 A | * | 4/1996 | Hemann et al. | 277/565 |
| 5,607,165 A | * | 3/1997 | Bredemeyer | 277/320 |
| 5,961,223 A | * | 10/1999 | Saigusa | 384/484 |
| 6,367,810 B1 | * | 4/2002 | Hatch | 277/551 |
| 6,428,013 B1 | * | 8/2002 | Johnston et al. | 277/400 |
| 6,921,080 B2 | * | 7/2005 | Johnen | 277/549 |
| 7,513,506 B2 | * | 4/2009 | Kondo et al. | 277/353 |
| 2005/0140097 A1 | * | 6/2005 | Kosty et al. | 277/627 |

* cited by examiner

*Primary Examiner* — Vishal Patel
(74) *Attorney, Agent, or Firm* — Gudrun E. Huckett

(57) ABSTRACT

A radial shaft seal has a support body and at least one sealing element that is a part produced separate from the support body and is connected to the support body by an adhesive connection. A static seal part that is a part separate from the sealing element and is arranged on a wall of the support body is provided. Alternatively, the sealing element comprises an integral static seal part and the static seal part is formed by a radially projecting edge of the holding part of the sealing element that projects radially past the wall of the support body.

5 Claims, 3 Drawing Sheets

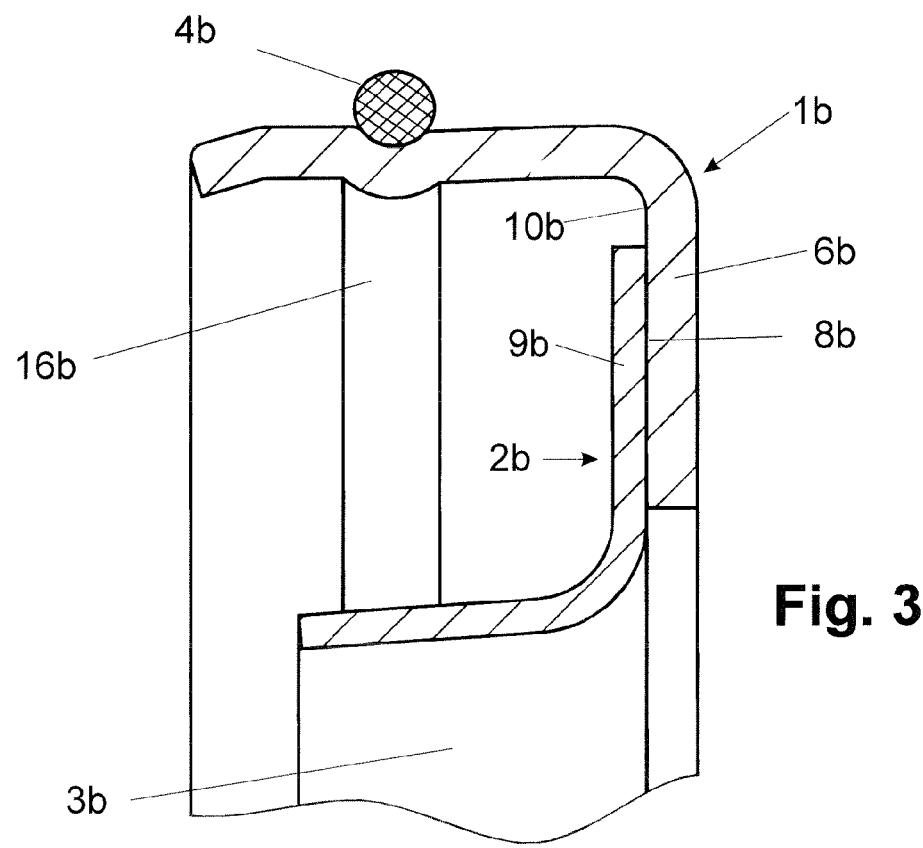
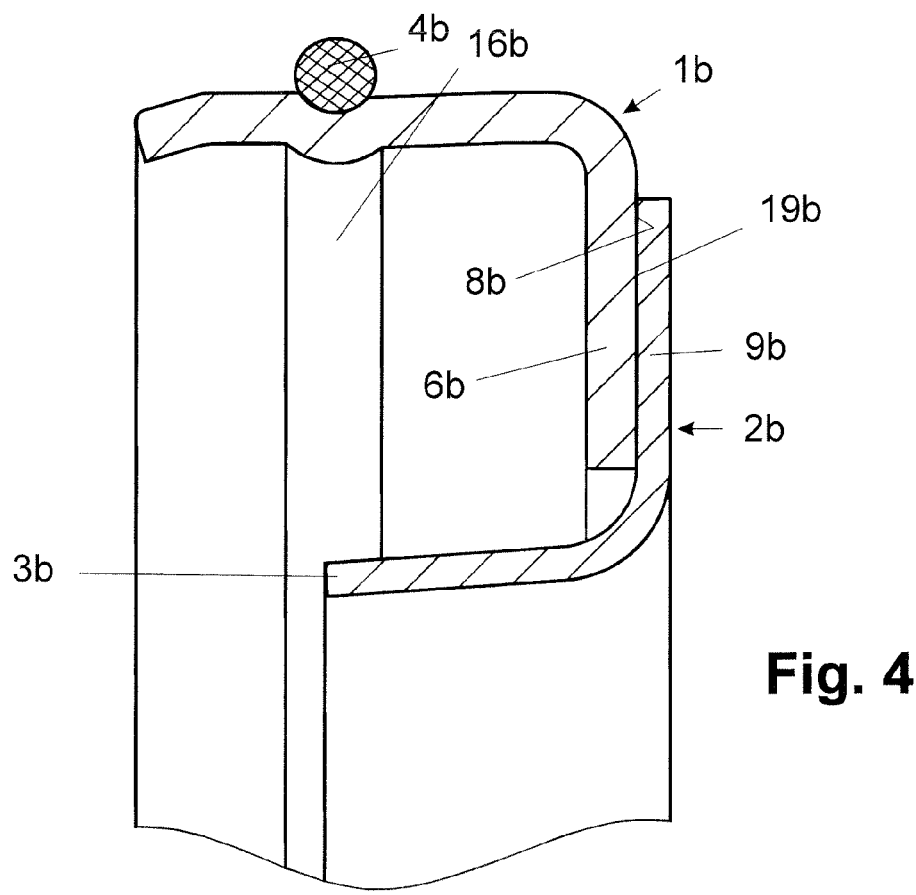

RADIAL SHAFT SEAL

The present invention is a divisional application of U.S. application Ser. No. 11/952,451, the entire disclosure of which is incorporated herein by reference, having a filing date of 7 Dec. 2007. The present invention claims priority to German patent application 10 2006 059 397.9, the entire disclosure of which is incorporated by reference herein, having a filing date of 8 Dec. 2006.

BACKGROUND OF THE INVENTION

The invention relates to a seal, in particular, a radial shaft seal, comprising a support body and at least one sealing element.

For sealing rotating shafts and for sealing spaces in which pressure differences exist, radial shaft seals are used. They are comprised in general of a metallic support body, an elastomer sealing element, and a coil tension spring. When producing such radial shaft seals, first the support body is coated with a binder. Subsequently, the support body is placed into a mold into which the elastomer mixture for the sealing element is injected from the center uniformly onto all sides by means of cone gate. In order to provide a permanent connection between the support body and the sealing element, the support body is molded into the elastomer material of the sealing element in such a way that the support body is partially embedded. After injection molding, the cone gate is cut off in the area of a sealing edge. Subsequently, the tension spring is mounted. The manufacture of such a radial shaft seal is complex and requires a relatively long processing time. For example, the support body must be pre-treated with the binder so that the adhesion to the sealing element is ensured. In order for the binder not to be removed during injection molding of the sealing element in the mold, the sealing element cannot be directly injection-molded, i.e., in the direction of the support body. The injection molding process is realized by means of a centrally positioned cone that proportionally comprises about 30 percent of the entire material and, in a subsequent process step, is cut off and disposed of. In order to achieve a satisfactorily stable connection of support body and sealing element, the sealing element with the thicker cross-section is injection-molded and often encloses the support body partially. As a result of this thick cross-section, a long processing time is required in order to vulcanize the sealing element. When errors are made during the injection molding process, not only the sealing element but also the expensive metallic support body turn into rejects.

SUMMARY OF THE INVENTION

It is an object of the present invention to configure a seal of the aforementioned kind such that it can be produced in a shorter amount of time and at reduced manufacturing costs with at least the same quality.

This object is solved for a seal of the aforementioned kind according to the present invention in that the sealing element is produced separately as a part separate from the support body and is connected to the support body by an adhesive connection and in that the seal comprises a static seal part that is a separate part from the sealing element and is attached to the wall of the support body.

This object is furthermore solved for a seal of the aforementioned kind according to the present invention in that the sealing element is produced separately as a part separate from the support body and is connected to the support body by an adhesive connection, and in that the sealing element is provided with an integral static seal part that is formed by a radially projecting rim of a holding part of the sealing element projecting past the wall of the support body.

As a result of the configuration according to the invention, the sealing element is separately produced as a part independent from the support body. The sealing element is not vulcanized to the support body but is produced as a separate shaped part. Since the vulcanization step is no longer required, the previously required binder is no longer needed. The sealing element requires less material because the cone gate injection step is no longer required because a direct injection molding process is possible and because the cross-section of the sealing element according to the invention is significantly thinner in comparison to the prior art shaft seal designs. By means of the adhesive connection the sealing element can be attached simply and reliably to the support body in a short period of time. Rejects of support bodies are prevented because of the adhesive connection. Moreover, the step of cutting off the sealing edge of the sealing element is no longer needed.

The seal according to the first embodiment has a static seal part that is separate from the sealing element. In this way, the static and the dynamic seal parts can be optimized with regard to their different sealing properties. In particular, for both seal parts the most expedient materials can be used, respectively.

In the seal according to the second embodiment, the static and the dynamic seal parts are components of the sealing element. In this way, the seal can be produced in a simple and inexpensive way.

BRIEF DESCRIPTION OF THE DRAWING

FIG. 3 shows a section view of a radial shaft seal according to the present invention in a third variant.

FIG. 4 shows a section view of a radial shaft seal according to the present invention in a fourth variant.

DESCRIPTION OF THE PREFERRED EMBODIMENTS

The radial shaft seals illustrated in FIGS. 1 to 4 serve generally for sealing rotating shafts and for sealing spaces with pressure differences of various degrees.

Figure 1:
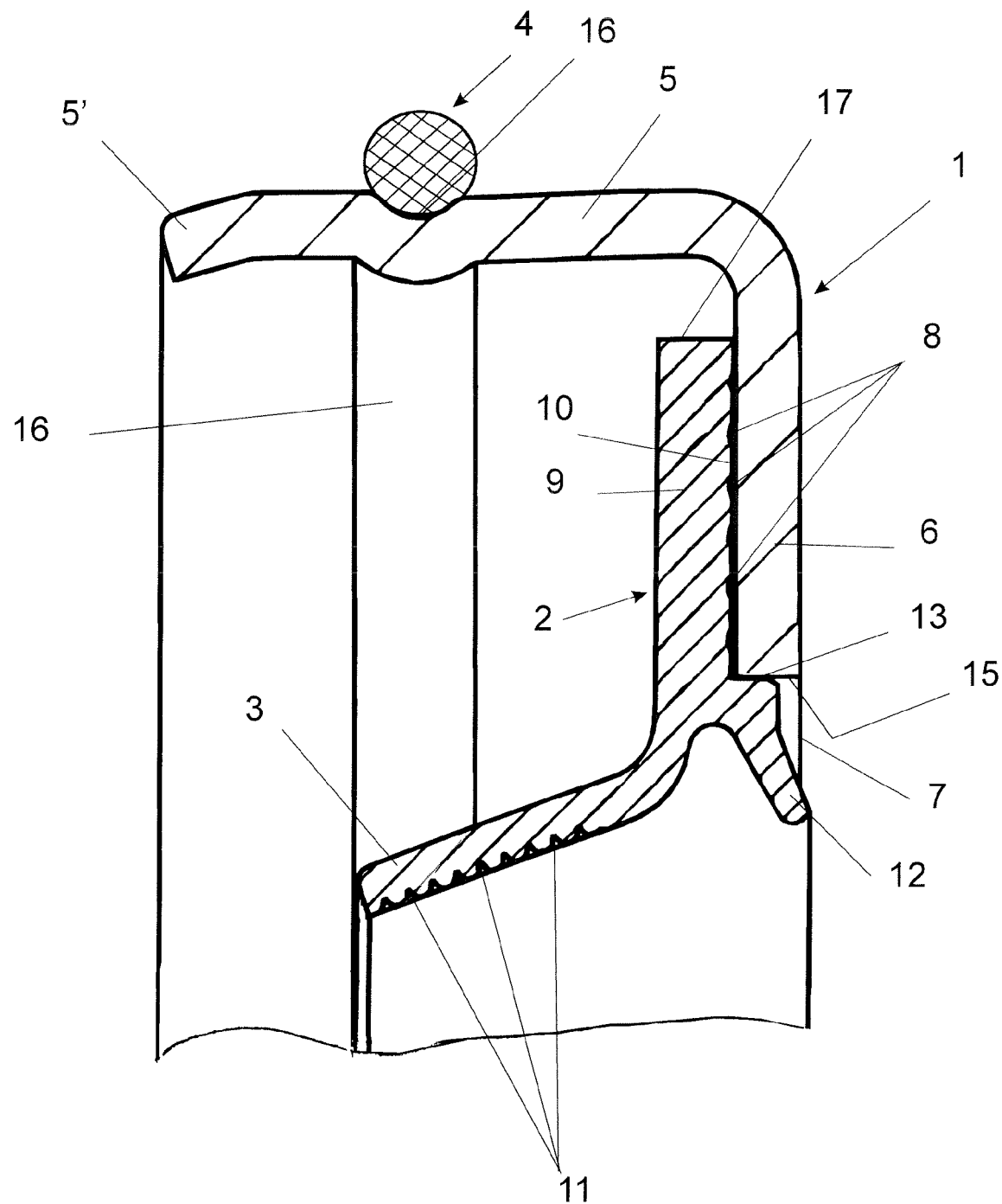
FIG. 1 shows a section view of a radial shaft seal according to the present invention in a first variant.

The seal according to FIG. 1 is comprised of a support body 1, a sealing element 2 having a dynamic seal part 3 and a static seal part 4. The support body 1 is cup-shaped and made of metal, such as conventional steel, carbon steel, galvanized steel, stainless steel, or is made of hard plastic material. Its essentially cylindrical wall 5 passes into a bottom 6 extending radially relative to the axis of the seal. The bottom 6 has a central opening 7 through which a shaft (not illustrated) projects when the seal is mounted. The free end 5' of the wall 5 is slightly inwardly bent and forms in this way an insertion aid for mounting the seal. Approximately at half the axial length, the wall 5 has at the exterior side a receptacle in the form of a circumferential groove 16 in which the static seal part 4 is arranged. It is preferably configured as a sealing ring made from "loctite" material. Advantageously, the support body 1 is produced in a simple and inexpensive rolling or drawing process.

The sealing element 2 is comprised preferably of rubber material and is produced as a part separate from the support body 1 by injection molding and subsequent vulcanization.

The sealing element 2 has a radially extending holding part 9 that has the shape of an annular disk and is adjoined by the dynamic seal part 3 extending at an obtuse angle relative to the holding part 9. The dynamic seal part 3 can be provided with a return device 11 for the fluid to be sealed (such return devices are known in the art of radial shaft seals e.g. in the form of grooves etc). The dynamic seal part 3 extends in the same direction as the wall 5 of the support body 1. The sealing element 2 has moreover a protective lip 12 that extends in the opposite direction compared to the seal part 3 and is significantly shorter than the seal part 3, as shown in FIG. 1. Such a protective lip 12 is known in general in the art of radial shaft seals. It passes by means of an outwardly positioned circumferential shoulder 13 into the holding part 9. By means of the cylindrical circumferential shoulder 13 that serves as a centering means for the sealing element 2, the sealing element 2 rests against the rim 15 of the opening 7. The holding part 9 has, for example, a greater thickness than the bottom 6 of the support body 1, the dynamic seal part 3, and the protective lip 12.

The holding part 9 of the sealing element 2 is attached to the inner side 10 of the bottom 6 of the support body 1 by means of an adhesive connection 8. The free edge 17 of the holding part 9 has a spacing relative to the wall 5 of the support body 1. The adhesive connection 8 has the advantage that the sealing element 2 can be produced inexpensively as a separate component in a short period of time. The sealing element 2 must not be vulcanized to the support body 1. It is therefore also not necessary to employ a binder for the vulcanization process. Moreover, the sealing element 2 can be produced with minimal material expenditure and minimal cross-sectional thickness because embedding of the support body 1 is not required. In this way, material costs can be reduced. Moreover, gluing the sealing element 2 to the support body 1 can be realized within a very short processing time of approximately 10 seconds. As a result of the independent, separate manufacture of the sealing element 2—separate from the support body 1—the number of rejects are moreover significantly reduced because there is no cone gate and there is no need for cutting off the sealing edge. The problem of contamination of the sealing element by the binder applied to the support body is also avoided.

The static seal part 4 must not be made from rubber; it can also be made from so-called "loctite" rope or string. In this way, the rubber consumption can be further reduced.

Figure 2:
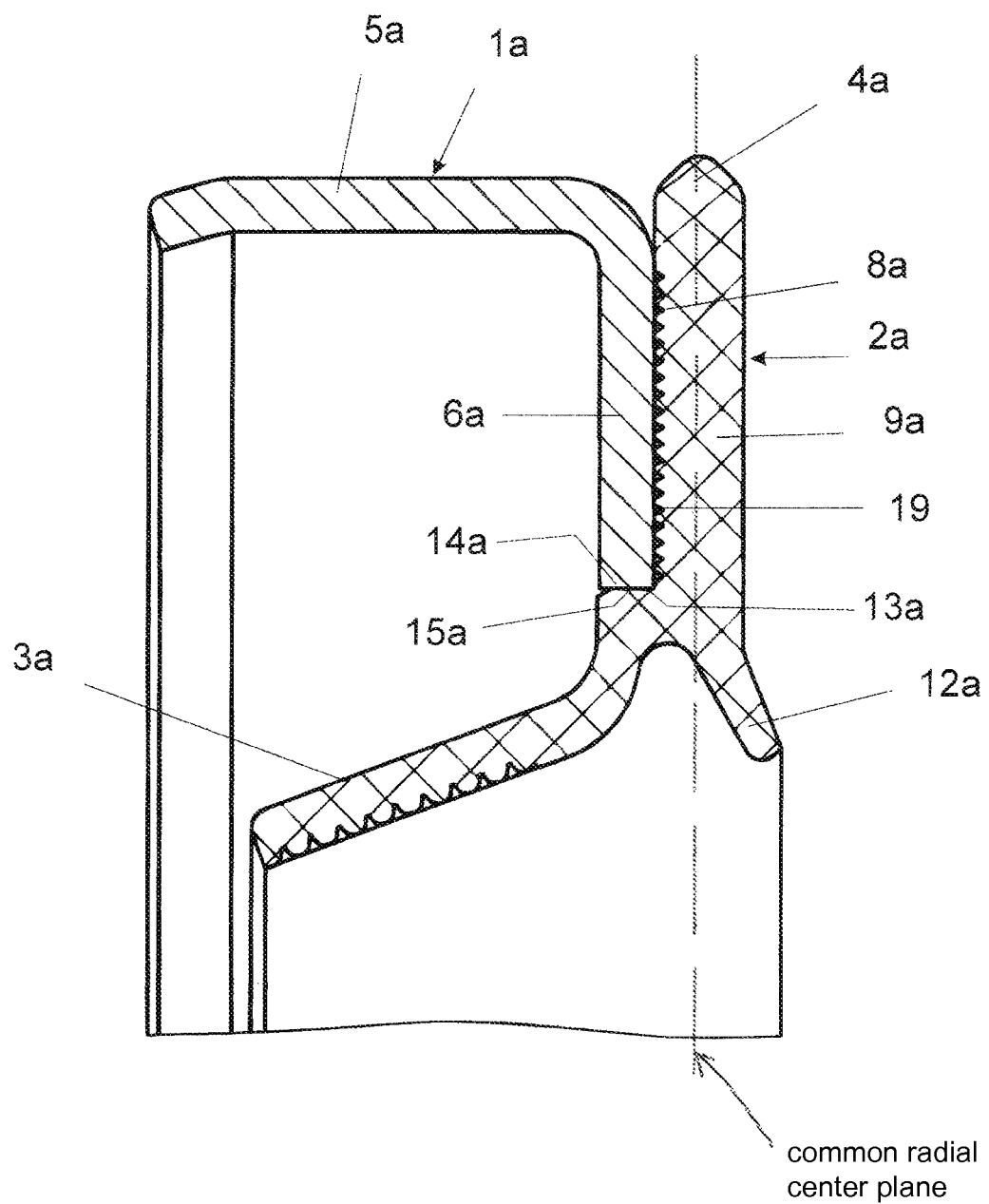
FIG. 2 shows a section view of a radial shaft seal according to the present invention in a second variant.

In the variant according to FIG. 2, the static seal part 4a is formed by the sealing element 2 itself so that a groove in the wall 5a of the support body 1a is not required. Moreover, the sealing element 2a is connected by an adhesive connection 8a to the exterior side 19 of the bottom 6a of the support body 1a. The annular disk-shaped holding part 9a of the sealing element 2a is longer than the holding part 9 of FIG. 1 so that it projects radially past the wall 5a of the support body 1a. This projecting circumferential edge tapers at an acute angle outwardly and forms the static seal part 4a of the sealing element 2. The projecting circumferential edge 4a of the sealing element 2a is elastically deformed when the sealing element 2a is mounted and, in this way, the elastic sealing action is achieved. Since the holding part 9a covers the bottom 6a of the support body 1a, the sealing element 2a can also be used as a corrosion protection of the support body 1a.

As in the embodiment according to FIG. 1, the support body 1a and the sealing element 2a are separate parts and are produced from metal or hard plastic material and rubber, respectively; they are connected to one another in an inexpensive and simple way by gluing. Because the static seal part 4a must not be produced separately and must not be held in a receiving groove on the support body 1a, this has moreover an advantageous effect on the manufacturing costs of the seal. The bottom 6a of the support body 1a is positioned with its inner edge 15a on the cylindrical shoulder 13a between the holding part 9a and the dynamic seal part 3a of the sealing element 2a.

The dynamic seal part 3a and the protective lip 12a of the sealing element 2a are identical to the corresponding parts of FIG. 1.

In the seals according to FIGS. 3 and 4, the sealing element 2b is comprised of polyfluorocarbon, preferably, polytetrafluoroethylene. It is comprised of an annular disc whose radial outer area forms the holding part 9b. When mounting the seal, the radial inner part is elastically bent by the shaft to be sealed to form the dynamic seal part 3b.

The support body 1b is identical to the support body 1 according to FIG. 1. It also has an annular groove 16b receiving the static annular seal part.

The variants of FIGS. 3 and 4 differ only in that, in the embodiment according to FIG. 3, the holding part 9b is glued to the inner side 10b and, in the embodiment according to FIG. 4, is glued to the outer side 19b of the bottom 6b of the support body 1b (glue or adhesive layer 8b). As in the embodiment of FIG. 1, the holding parts 9b extend only across a portion of the radial width of the bottom 6b of the support body 1b.

Since the sealing elements 2b are glued to the support body 1b, the seals can also be produced in a simple and inexpensive way.

The seals according to FIGS. 1 through 4 are suitable in particular as shaft seals or piston seals as they are used in machine construction, apparatus engineering, and automotive engineering.

While specific embodiments of the invention have been shown and described in detail to illustrate the inventive principles, it will be understood that the invention may be embodied otherwise without departing from such principles.

What is claimed is:
1. A radial shaft seal comprising:
a monolithic support body having a cylindrical wall, comprising a first end and a second end, and a bottom connected to the first end of the cylindrical wall and extending inwardly in a radial direction of the cylindrical wall, wherein the bottom has a radially extending exterior side;
wherein the cylindrical wall is free of a static sealing part across the entire axial length between the first and second ends;
at least one sealing element;
wherein the at least one sealing element is a shaped part that is produced separate from the support body and wherein the shaped part produced separate from the support body is subsequently connected by an adhesive connection to the support body;
wherein the at least one sealing element is a monolithic element that comprises a holding part and an integral static seal part, wherein the holding part is an annular disk comprising an annular face that is connected by the adhesive connection to the exterior side of the bottom, wherein the holding part passes in the radial direction outwardly into the integral static seal part and the annular face extends up to and adjoins the integral static seal part;
wherein the holding part and the integral static seal part are extending radially in a common plane and have a common radial center plane;

wherein the integral static seal part projects in the radial direction outwardly past the cylindrical wall of the support body and is positioned in axial direction adjacent to the first end of the cylindrical wall and does not project axially past the annular face in a direction toward the cylindrical wall, wherein the holding part covers the bottom and forms an exterior bottom side of the radial shaft seal.

2. The radial shaft seal according to claim 1, wherein the at least one sealing element is comprised of rubber or of polyfluorocarbon.

3. The radial shaft seal according to claim 1, wherein the holding part of the at least one sealing element extends essentially across the entire radial extension of the bottom of the support body.

4. The radial shaft seal according to claim 1, wherein the at least one sealing element has a dynamic seal part and a protective lip, wherein the protective lip and the dynamic seal part point in opposite directions.

5. The radial shaft seal according to claim 4, wherein the dynamic seal part has a return conveying device.

\* \* \* \* \*